US007918391B2

(12) United States Patent  
Clegg et al.

(10) Patent No.: US 7,918,391 B2
(45) Date of Patent: Apr. 5, 2011

(54) TRANSACTION PRODUCT WITH HINGED PUZZLE SEGMENTS

(75) Inventors: Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 251 days.

(21) Appl. No.: 12/262,433

(22) Filed: Oct. 31, 2008

(65) Prior Publication Data

US 2010/0108757 A1  May 6, 2010

(51) Int. Cl.
G06K 5/00 (2006.01)
(52) U.S. Cl. .................................. 235/380; 273/157 R
(58) Field of Classification Search ............... 235/380; 273/157 R
See application file for complete search history.

(56) References Cited

U.S. PATENT DOCUMENTS

| | | | |
|---|---|---|---|
| 908,410 | A | 12/1908 | Jensen |
| 2,712,447 | A | 7/1955 | Steinhardt |
| D238,698 | S | 2/1976 | Cook |
| 4,580,783 | A | 4/1986 | Cohan |
| 4,793,615 | A | 12/1988 | Martin |
| 5,324,037 | A | 6/1994 | Greeson |
| 5,725,213 | A | 3/1998 | Kuczynski |
| 5,947,473 | A | 9/1999 | Spitzer |
| 5,988,639 | A | 11/1999 | Seldin |
| 6,039,318 | A | 3/2000 | Kuczynski |
| 6,467,205 | B1 * | 10/2002 | Flagg et al. ............. 40/107 |
| 6,536,764 | B1 | 3/2003 | Spitzer |
| 6,786,797 | B1 * | 9/2004 | Cheng .................... 446/487 |
| 6,974,130 | B2 | 12/2005 | Sugden |
| 7,213,764 | B2 | 5/2007 | Lasch et al. |
| 2002/0143697 | A1 | 10/2002 | Gotfried |
| 2005/0194454 | A1 | 9/2005 | Ferber et al. |
| 2006/0157554 | A1 * | 7/2006 | Halbur et al. ............. 235/380 |
| 2007/0016941 | A1 | 1/2007 | Gonzalez et al. |
| 2007/0194128 | A1 | 8/2007 | Coe et al. |
| 2007/0241198 | A1 | 10/2007 | Halbur et al. |
| 2007/0252010 | A1 | 11/2007 | Gonzalez et al. |
| 2008/0149709 | A1 | 6/2008 | Boyd et al. |
| 2008/0149727 | A1 | 6/2008 | Boyd et al. |
| 2008/0223923 | A1 | 9/2008 | Porvaznik et al. |

OTHER PUBLICATIONS

U.S. Appl. No. 11/753,854, filed May 25, 2007, entitled "Mechanically Convertible Transaction Product."

(Continued)

*Primary Examiner* — Daniel A Hess
*Assistant Examiner* — Rafferty Kelly
(74) *Attorney, Agent, or Firm* — Griffiths & Seaton PLLC

(57) ABSTRACT

A transaction product has an account identifier and includes a series of interconnected, hinged puzzle segments. The various hinged segments may be collectively manipulated to reveal a variety of surfaces, graphics, and indicia. The transaction card may include a number of three-dimensional segments (e.g., eight polyhedral segments) interconnected such that each segment is hingedly connected to two other segments via a hinge structure, wherein the hinge structures on any given cube are orthogonal to each other, resulting in a closed chain of transformations. The hinge structures may be formed via skin components (e.g., plastic, paper, or other laminate media) bonded directly to respective pairs of the three-dimensional segments. The account identifier is associated with the housing and links the transaction product to an account or record having a value configured to be used toward one or more of a purchase and a use of goods or services.

26 Claims, 12 Drawing Sheets

OTHER PUBLICATIONS

U.S. Appl. No. 11/931,696, filed Oct. 31, 2007, entitled "Transaction Product With Memory."

U.S. Appl. No. 11/931,961, filed Oct. 31, 2007, entitled "Transaction Product With Generator."

U.S. Appl. No. 11/932,044, filed Oct. 31, 2007, entitled "Transaction Product With Movable Member."

U.S. Appl. No. 11/965,467, filed Dec. 27, 2007, entitled "Transaction Product With Storage Chamber."

U.S. Appl. No. 11/964,474, filed Dec. 27, 2007, entitled "Transaction Card with Movable Member."

U.S. Appl. No. 12/138,684, filed Jun. 13, 2008, entitled "Cake Topper Transaction Product."

U.S. Appl. No. 12/138,727, filed Jun. 13, 2008, entitled "Transaction Card with Moveable Member."

U.S. Appl. No. 12/139,199, filed Jun. 13, 2008, entitled "Transaction Product with Removeable Cosmetic Article."

Wade, Will, "First Data Sees Sticker Device as Mobile-Pay Bridge," American Banker, Aug. 25, 2008, 2 pages.

"Contactless Payments: Consumer Trends and Usage Preferences," firstdata.com, 2008, 2 pages.

"Payment Processing: Mobile Commerce and the M-Wallet: A Market Brief," Retail Solutions Online, May 10, 2007, 2 pages.

\* cited by examiner

TRANSACTION PRODUCT WITH HINGED PUZZLE SEGMENTS

BACKGROUND OF THE INVENTION

Stored-value cards and other transaction products come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Transaction products provide a number of advantages to both the consumer and the retailer.

SUMMARY

One aspect of the present invention relates to a transaction product having an account identifier and a plurality of hinged puzzle segments. In one embodiment, the transaction product and its various components, taken together, include a set of segments (e.g., three-dimensional polyhedral segments) interconnected such that each segment is hingedly connected to one or more other segments within the set of segments via a hinge structure. In one embodiment, the hinge structures associated with any given segment are orthogonal to each other, and manipulation of the hinged segments results in a closed chain of transformations. In a further embodiment, the hinge structures are formed via skin layers (e.g., plastic, paper, or other laminate media) bonded directly to respective pairs of segments. The account identifier links the transaction product to an account or record having a value configured to be used toward one or more of a purchase and a use of goods or services. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A stored-value card and other transaction products are adapted for making purchases of goods and/or services at, for example, a retail store or website and/or for storing non-monetary value adapted for redemption toward the use of goods and/or services (e.g., a phone card). According to one embodiment, an original consumer buys a transaction product to give a recipient who in turn is able to use the transaction product at a retail store or setting to pay for the goods and/or services. A transaction product, according to embodiments of the present invention, provides the consumer and recipient with extra amusement and non-transactional functionality in addition to the ability to pay for goods and/or services with the transaction product.

In particular, the transaction product includes a series of interconnected, hinged puzzle segments, and is configured for use toward the purchase or use of one or more of goods and/or services. During non-transactional use, the various hinged segments may be collectively manipulated to reveal a variety of surfaces, graphics, and indicia. In a particular embodiment, the indicia include graphics relating to a particular event or holiday.

In one example, the transaction card consists of a number of three-dimensional segments (e.g., eight polyhedral segments) interconnected such that each segment is hingedly connected to two other segments via a hinge structure, wherein the hinge structures on any given segment are orthogonal to each other. In a particular embodiment, manipulation of the hinged segments results in a closed chain of transformations. In one embodiment, the hinge structures are formed via skin components (e.g., plastic, paper, or other laminate media) bonded directly to respective pairs of the three-dimensional segments.

Figure 1:
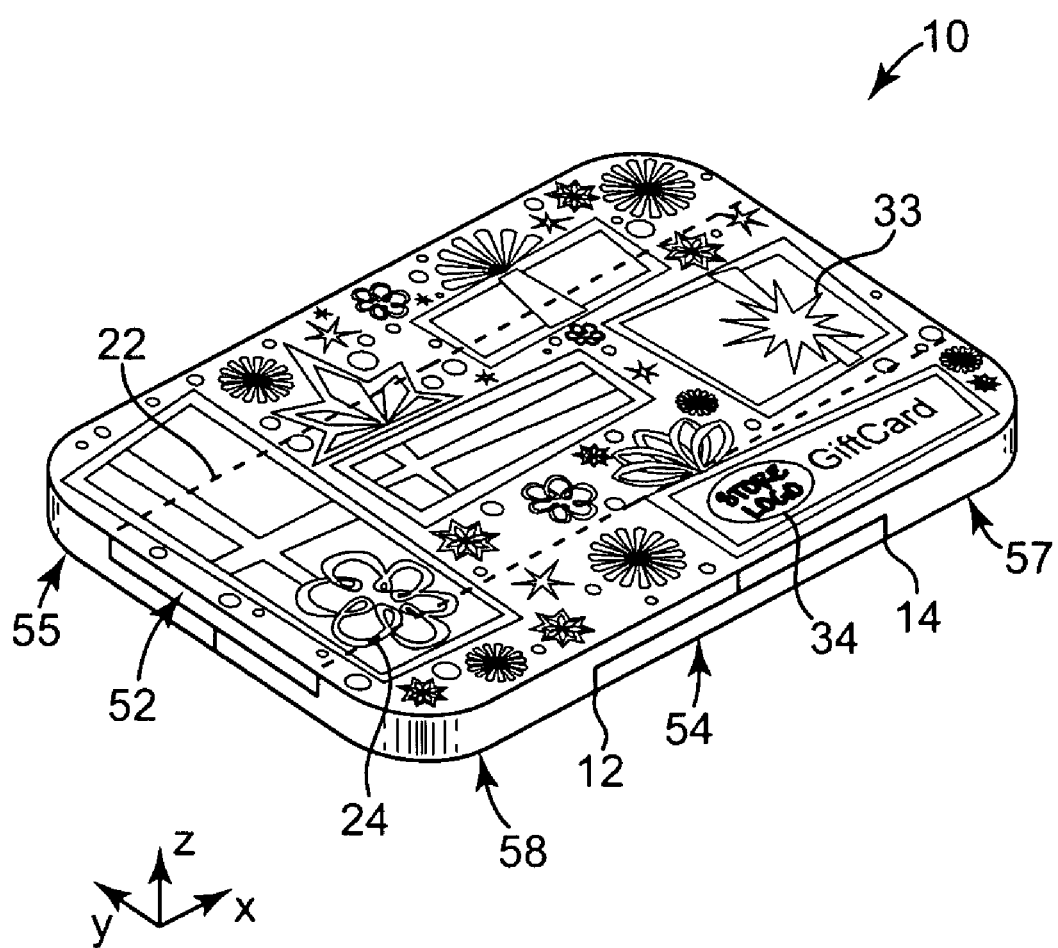
FIG. 1 is perspective view illustration of a transaction product, according to one embodiment of the present invention.
Figure 2:
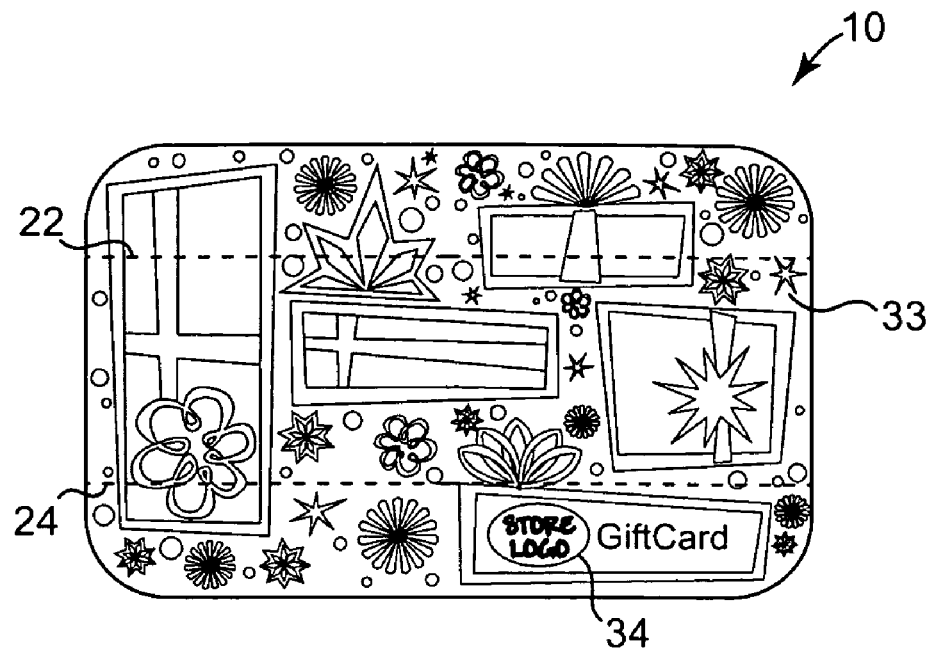
FIG. 2 is a top view of the transaction product of FIG. 1, according to one embodiment of the present invention.
Figure 3:
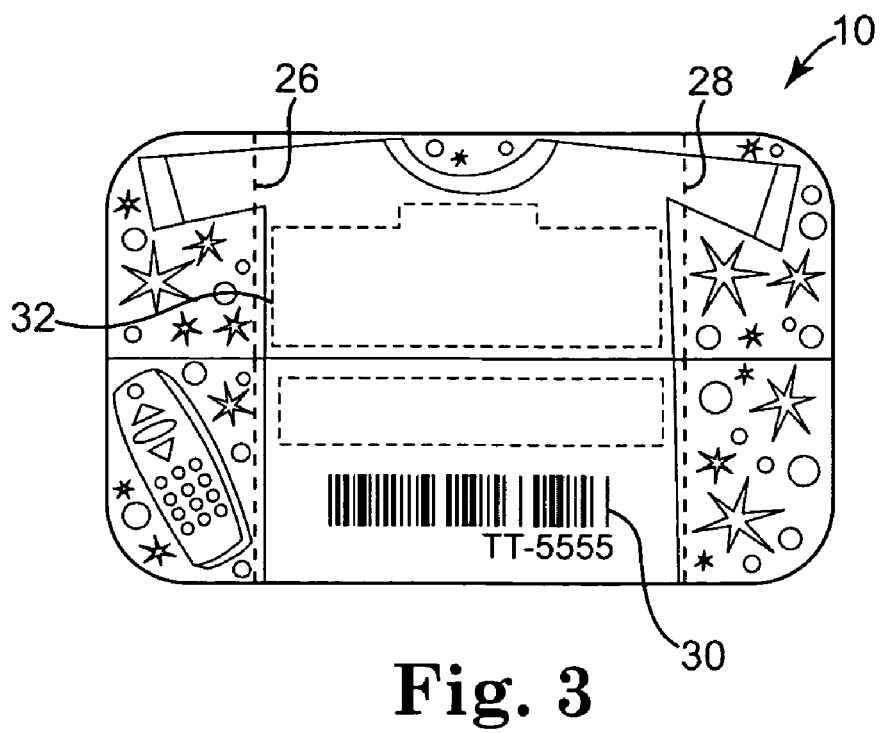
FIG. 3 is a bottom view of the transaction product of FIG. 1, according to one embodiment of the present invention.

Turning to the figures, FIGS. 1-3 illustrate a transaction product 10 (e.g., a financial transaction product and/or stored-value card) according to one embodiment of the present invention in a "closed" or "reference state." That is, as will become apparent, transaction product 10 may be manipulated to form a wide variety of states or configurations, and thus the term "reference state" as used herein refers to the state illustrated in FIGS. 1-3, wherein the segments are closed or collapsed such that transaction product 10 is substantially flat and has a profile similar to a conventional credit card, debit card, or the like.

As will more clearly described below, transaction product 10 includes a set of segments (e.g., segments 54, 55, 57, 58, etc.) hingedly connected along respective axes (e.g., axes 22 and 24) such that it may be manipulated by a user to pleasantly expose certain indicia and graphics (e.g., indicia 32, 33, and 34) in a puzzle-like manner. In one embodiment, hinge structures (e.g., 12 and 14) are formed by skin components attached between adjacent segments, such that deformation of the skin component itself forms the hinge structure. Transaction product 10 may include redemption indicia 32.

Figure 4:
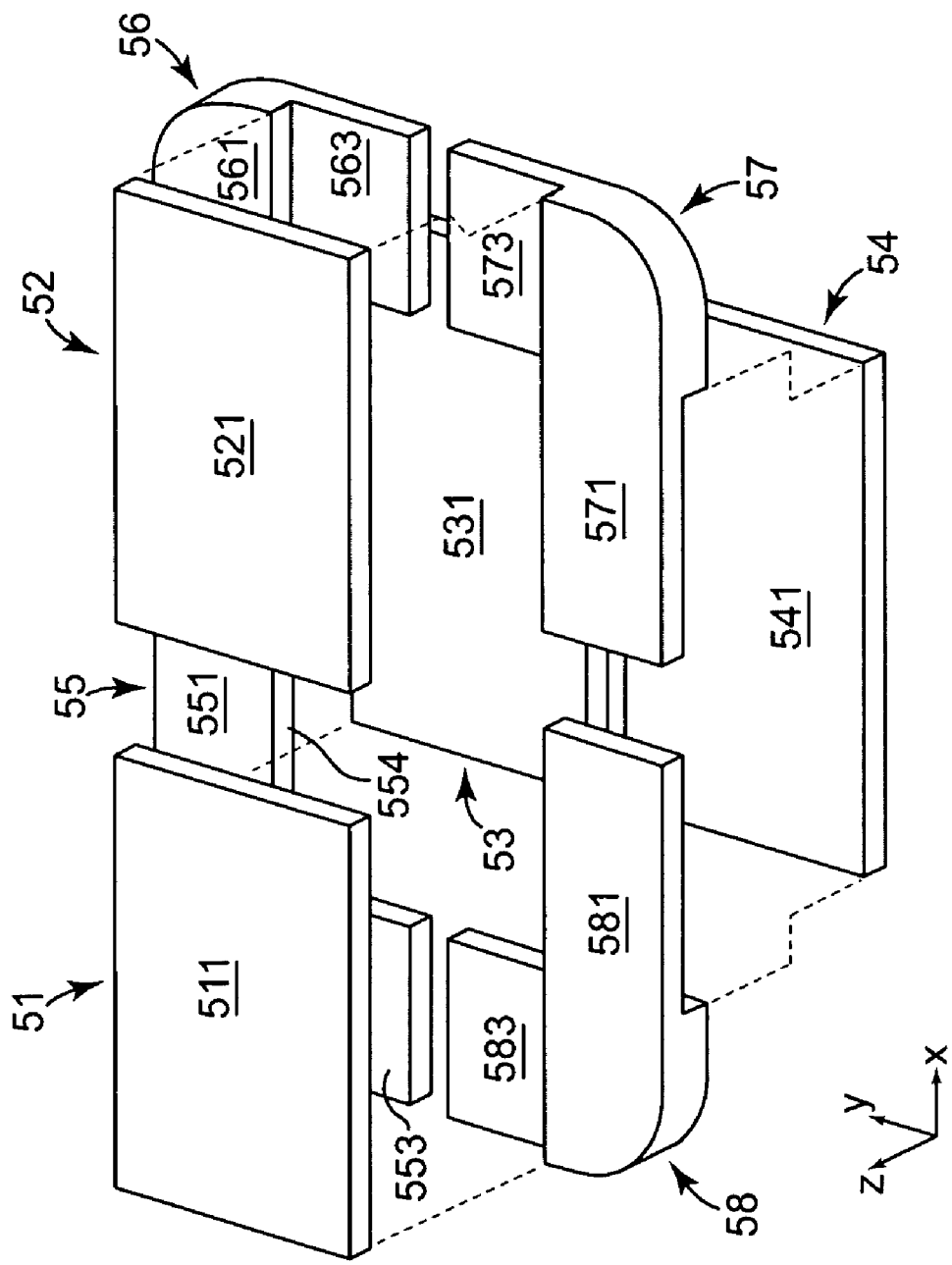
FIG. 4 is a top cut-away view of a transaction product, according to one embodiment of the present invention.
Figure 5:
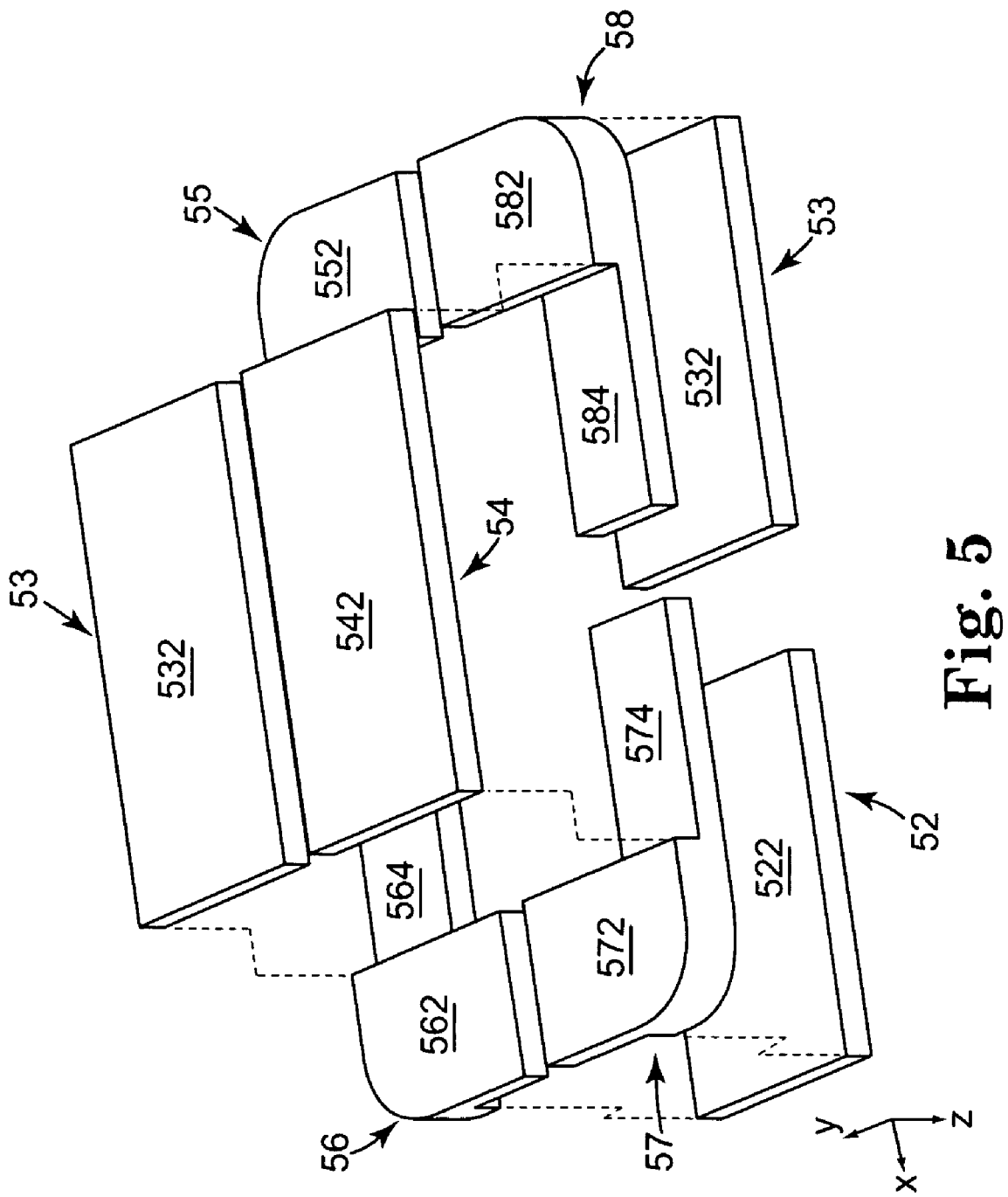
FIG. 5 is a bottom cut-away view of the transaction product shown in FIG. 4, according to one embodiment of the present invention.

More particularly, FIGS. 4 and 5 are exploded views (top view and bottom view, respectively) showing the shape, configuration, and placement of segments in accordance with one embodiment.

As shown, the exemplary embodiment includes a set of eight segments, i.e., segments 51, 52, 53, 54, 55, 56, 57, and 58. Certain groups of segments have the same shape or have symmetric shapes. That is, segments 51 and 52 are matching rectangular prisms, segments 53 and 54 are also matching rectangular prisms, and segments 55, 56, 57, and 58 are symmetrical corner segments with complex curvilinear shapes.

Each of the segments has a number of surfaces. For ease of reference in FIGS. 4 and 5, surfaces are labeled with a three digit number such that the first two digits refer to the segment number, and the last digit refers to a unique surface number for that segment. Accordingly, segment 51 includes surfaces 511 and 512, segment 57 includes surfaces 571, 572, 573, and 574, and so on. It will be apparent that, for the purposes of clarity, only certain surfaces have been labeled—i.e., surfaces that in one embodiment are bonded to a plurality of skin components.

Figure 6:
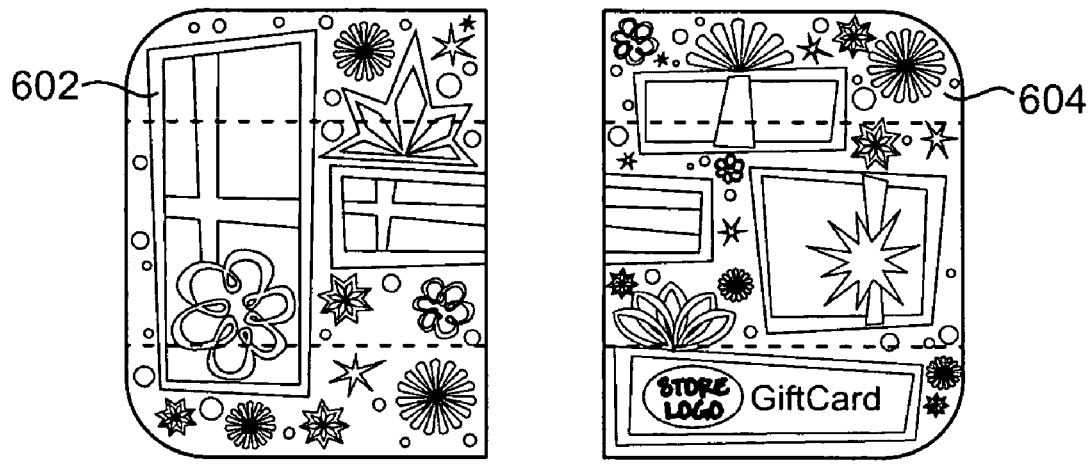
FIG. 6 is a top view of two puzzle skin components, according to one embodiment of the present invention.
Figure 7:
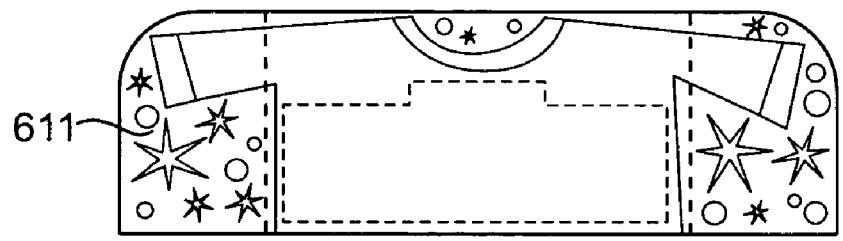
FIG. 7 is a top view of two additional puzzle skin components, according to one embodiment of the present invention.
Figure 7:
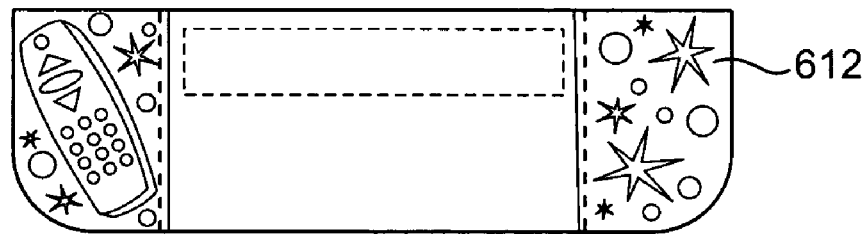
Figure 8:
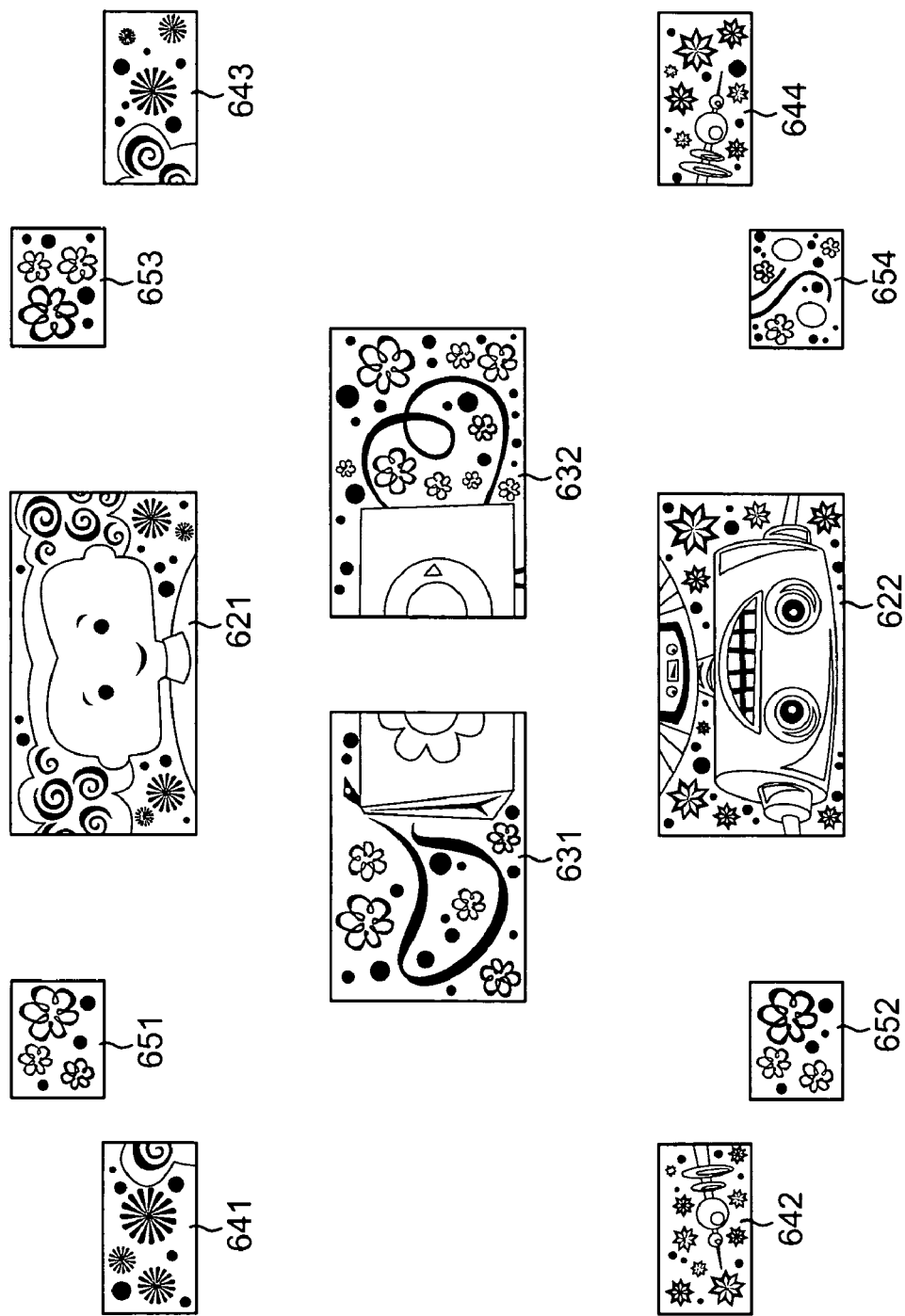
FIG. 8 is a top view of twelve additional puzzle skin components, according to one embodiment of the present invention.

FIGS. 6-8 depict a number of skin components (e.g., thin layers of plastic, paper, or the like) which may also include indicia or other graphics, and which are bonded to one or more of the surfaces illustrated in FIGS. 1 and 2. That is, any indicia 32, 33, and 34 illustrated in FIGS. 1 and 2 is provided by the aggregate graphics and indicia provided on the respective skin components.

In the illustrated embodiment, each skin component (602, 604, 611, 612, 621, 622, 631, 632, 641, 642, 643, 644, 651, 652, 653, 654) is bonded (e.g., via an adhesive) or otherwise attached or integrated into one or more of surfaces 511-584. In some cases, a particular skin component is attached to a single segment, primarily for the purpose of decoration or presenting indicia, while in other cases a particular skin component is attached to two or more (generally three) segments, thereby forming a hinge structure at the interface adjacent edges of the corresponding segments. Any other convenient hinge structure may alternatively be used.

In the illustrated embodiment, skin component 611 is connected to (and forms the respective hinge structures associated with) three segments: 56, 53, and 55. Similarly, skin component 612 is connected to segments 54, 57, and 58. Skin component 602 is connected to segments 51, 55, and 58, while skin component 604 is connected to segments 52, 56, and 57. The remaining skin components fit on respective surfaces of a single segment. Thus, skin components 621 and 622 are attached to surfaces 531 and 541, respectively; skin components 631 and 632 are attached to surfaces 522 and 532, respectively; skin components 641, 643, 642, and 644 are attached to surfaces 564, 574, 554, and 584 respectively; skin components 651, 652, 653, and 654 are attached to surfaces 553, 563, 583, and 573, respectively.

In the illustrated embodiment, each segment hingedly rotates with respect to its adjoining segments in a manner that is either parallel or orthogonal to that segment. That is, segment 52 rotates with respect to segment 57 along an axis that is parallel to an axis about which segment 52 rotates with respect to segment 56. Similarly, segment 51 rotates with respect to segments 55 and 58 along respective axes that are parallel. In contrast, segment 56 rotates with respect to segment 52 along an axis that is orthogonal to the axis about which segment 56 rotates with respect to 531.

Stated another way, corner segments 55, 56, 57, and 58 are each hingedly coupled to adjacent segments along orthogonal rotation axes, while the rectangular segments 511, 521, 531, and 541 are hingedly coupled to adjacent segments (i.e., opposite corner segments) along parallel rotation axes.

Figure 9A:
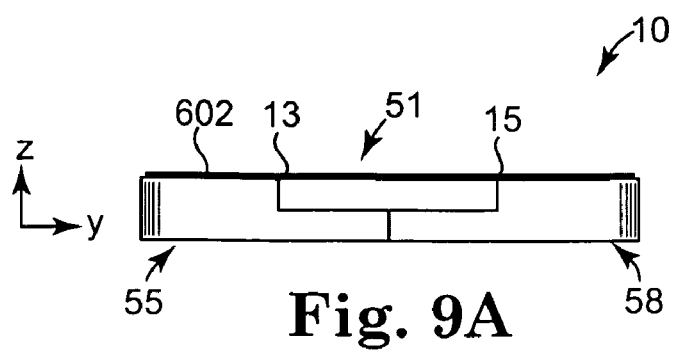
FIGS. 9A and 9B depict the rotation of various puzzle pieces, according to one embodiment of the present invention.
Figure 9B:
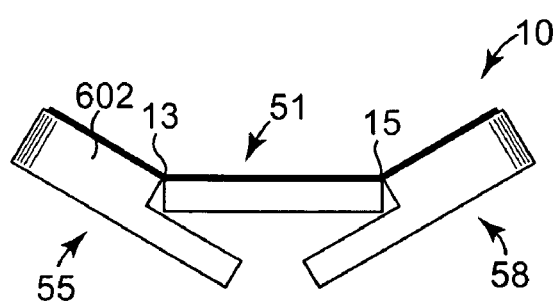

FIGS. 9A-9B and 10A-10B illustrate, in side view, exemplary rotations of various segments of transaction product 10. As shown in FIG. 9A, segments 55, 51, and 58 are interconnected via skin component 602, which is suitably bonded thereto, and which forms two hinge structures 13 and 15. During user manipulation, as shown in FIG. 9B, segment 55 rotates along an axis parallel to the x-axis (out of the page in FIG. 9B) and intersecting hinge structure 13. Likewise, segment 58 rotates (in a direction opposite that of segment 55) along an axis parallel to the x-axis and intersecting hinge structure 15.

Figure 10A:
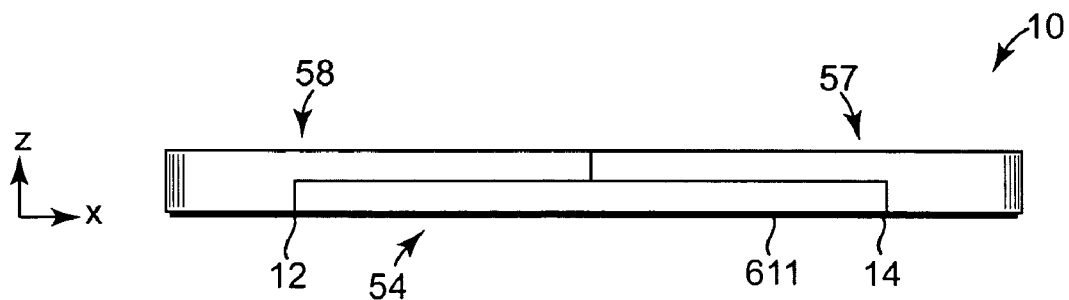
FIGS. 10A and 10B depict the rotation of various puzzle pieces, according to one embodiment of the present invention
Figure 10B:
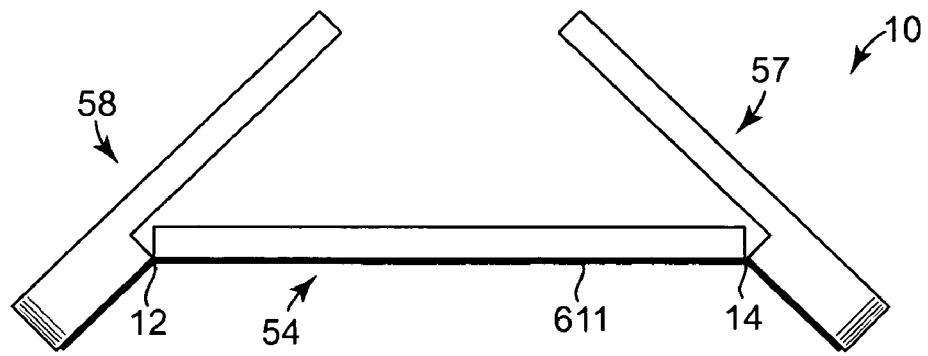

Similarly, FIGS. 10A and 10B show exemplary rotations of segments 58 and 57 with respect to segment 54. Skin component 611 forms hinge structures 12 and 14, each of which allows rotation parallel to the y-axis. The rotation axes defined by hinge structures 12 and 14 are thus substantially parallel to each other and substantially perpendicular to the rotation axes defined by hinge structures 13 and 15.

Figure 11:
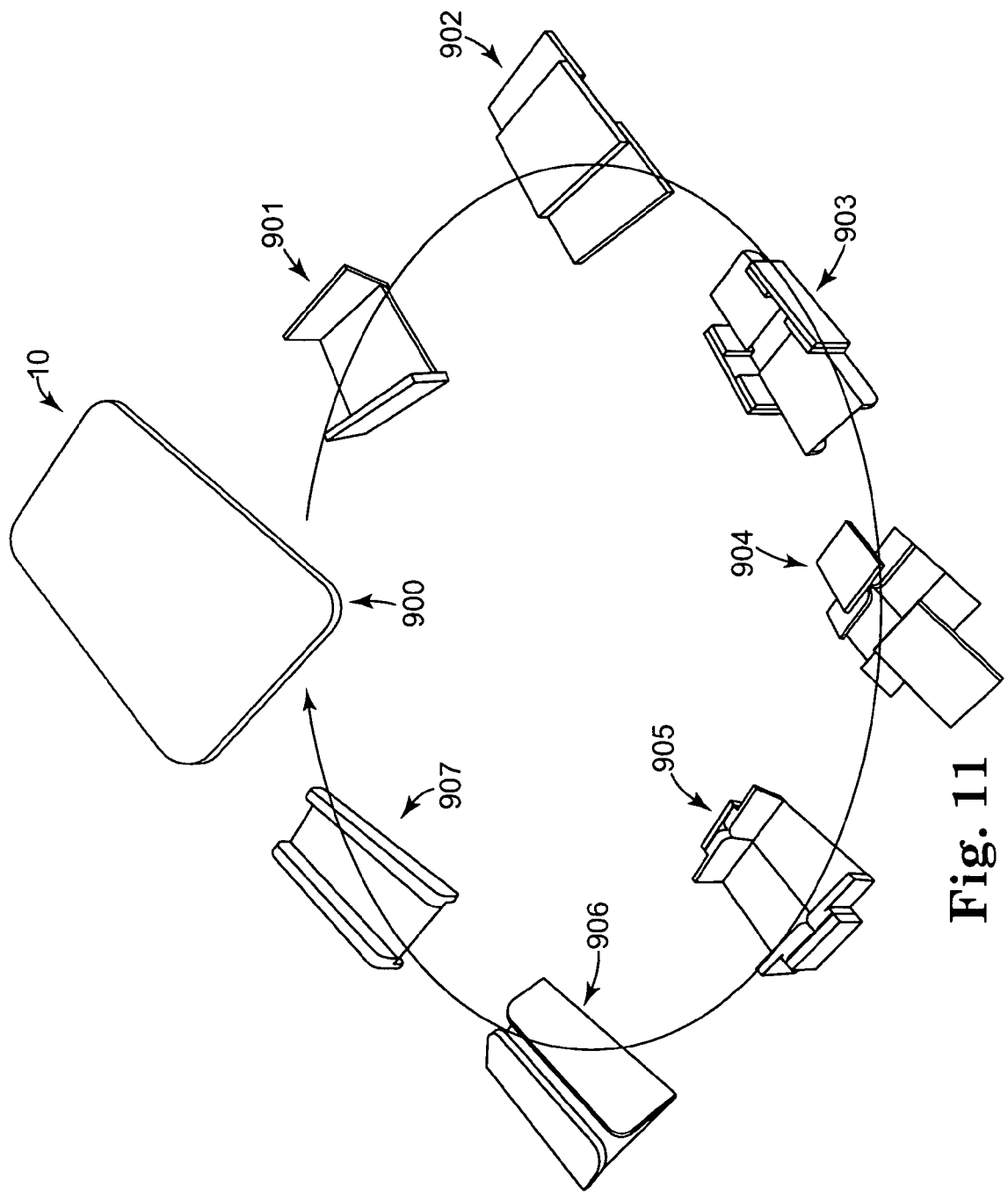
FIG. 11 depicts an exemplary transaction product at various states during manipulation, according to one embodiment of the present invention.

During use of transaction product 10 for entertainment purposes, then, the various segments can be manipulated by the user in a pleasing manner to form a variety of shapes and to expose any graphics or indicia included on the exposed skin components. In the illustrated embodiment, a closed chain of transformations take place as transaction product 10 is manipulated, producing a plurality of successive configurations that proceed in a closed loop. That is, progressive manipulation of the various segments will allow the user to return to the initial state (e.g., the reference state) of transaction product 10. The phrase "closed chain" is thus used in a topological sense. Stated another way, if the nodes of an undirected graph are used to represent the set of possible segment configurations, and the "edges" of the graph are used to represent permissible transformations between those configurations, the resulting graph would be a simple closed graph where each node has a degree of two (i.e., is connected to two edges). This is illustrated in FIG. 11, which depicts various configurations of transaction product 10 as the segments are manipulated in a particular sequence. As shown, the card starts in the reference state 900. Rotation of opposing segments produces a second configuration 901, followed by configuration 902, 903, 904, 905, 906, 907, and ultimately the original reference configuration 900. Other sequences of segment manipulation are also contemplated.

The extent to which a particular segment is allowed rotate with respect to an adjacent segment will depend upon, among other things, the thickness of the segments. For example, in the event that the segments are very thin, the skin components will form a hinge structure that allows one segment to be bent back and forth freely in both directions (i.e., approximately 360 degrees). In the illustrated embodiment, however, the thickness of the segments (e.g., 0.25 inches) is such that rotation in one direction is prevented by contact between the edge faces of adjacent segments. In such a case, the segments can freely rotate approximately 180 degrees with respect to each other. This can be seen in FIG. 1, for example, where it is apparent that hinge structure 12 will not allow rotation of segment 58 clockwise with respect to segment 54, but will allow rotation counterclockwise 180 degrees until it contacts segment 54.

The segments may be formed, for example, using a cardboard, a foam board material, or a plastic such as polycarbonate, polystyrene, polyvinyl chloride (PVC), acrylonitrile butadiene styrene (ABS), acrylonitrile styrene, polyethylene terephthalate (PET), teslin, polylactide (PLA), or other suitable material. Similarly, the skin components may be any suitably thin material, such as a plastic, paper, or composite material, and may be bonded to the individual segments using any number of conventional methods.

Transaction product 10, in its reference state, may have any suitable size and shape, but in one embodiment has a length and width similar to that of a common credit card (e.g., approximately 3.63 inches×2.42 inches), and has a thickness of approximately 0.25 inches.

Referring to the bottom view illustration of FIG. 3, stored-value card 10, for example, any skin components attached thereto, includes at least one account activation area or account identifier 30, such as a bar code, a magnetic strip, a smart chip or other electronic device, a radio frequency identification (RFID) device, or other suitable identifier readily machine readable by a point-of-sale terminal, account access station, kiosk, or other suitable device. In one embodiment where account identifier 30 is machine readable, account identifier 30 is also readable by a bearer of transaction product or stored-value card 10 such that transaction product 10 can be used when a machine configured to read transaction product 10 is not present (e.g., when using transaction product 10 to make a purchase on a web site). For example, account identifier 30 may include a number or letter string identifying the associated account or record and/or a password (not illustrated) associated therewith. Account identifier 30 may be printed or applied to any suitable surface or combination of surfaces, segments, or skin components.

Account identifier 30 indicates and therefore links transaction product 10 to a financial or other stored-value account or record. The account or record indicates a value or balance (e.g., monetary value, points, minutes, or other balance) associated with transaction product 10 and optionally is maintained on a database, other electronic or manual record-keeping system, or, in the case of "smart" cards for example, on a chip or other electronic device on/in transaction product 10 itself. Accordingly, by scanning account identifier 30, the account or record linked to transaction product 10 is identified and can subsequently be activated, have amounts debited therefrom, and/or have amounts credited thereto. Account identifier 30 is one example of means for linking transaction product 10 with an account or record.

In one embodiment, redemption indicia 32 are included on transaction product 10, such as on one of the various skin components. Redemption indicia 32 indicate that transaction product 10 is redeemable for the purchase of goods and/or services and that, upon use, a value of the purchased goods and/or services will be deducted from the account or record linked to transaction product 10. In one embodiment, redemption indicia 32 include phrases such as "<NAME OF STORE> GiftCard" and "This GiftCard is redeemable for merchandise or services at any of our stores or at our web site," provides help or phone line information in the case of a lost, stolen, or damaged transaction product, etc.

In one embodiment, transaction product 10 includes printed indicia 34. Printed indicia 34 include any suitable graphics, text, or combinations thereof. In one example, printed indicia 34 include one or more brand identifiers and/or other graphical items, described in further detail below.

Brand identifiers include one or more of a logo, text, trademark, etc. that associate transaction product 10 with at least one of a product, a brand, a store, etc. Other indicia or additional features may also be included on transaction product 10 as will be apparent to those of skill in the art upon reading this application. Any one or more of printed indicia 34 may not be included on transaction product 10.

In the illustrated embodiment, the resulting housing transaction product 10 in its reference state (as illustrated in FIGS. 1-3) is a substantially rectilinear volume. However, housing 12 may have a variety of 3D shapes, such as cylindrical, parallelepiped, prismatic, spherical, and the like.

Figure 14:
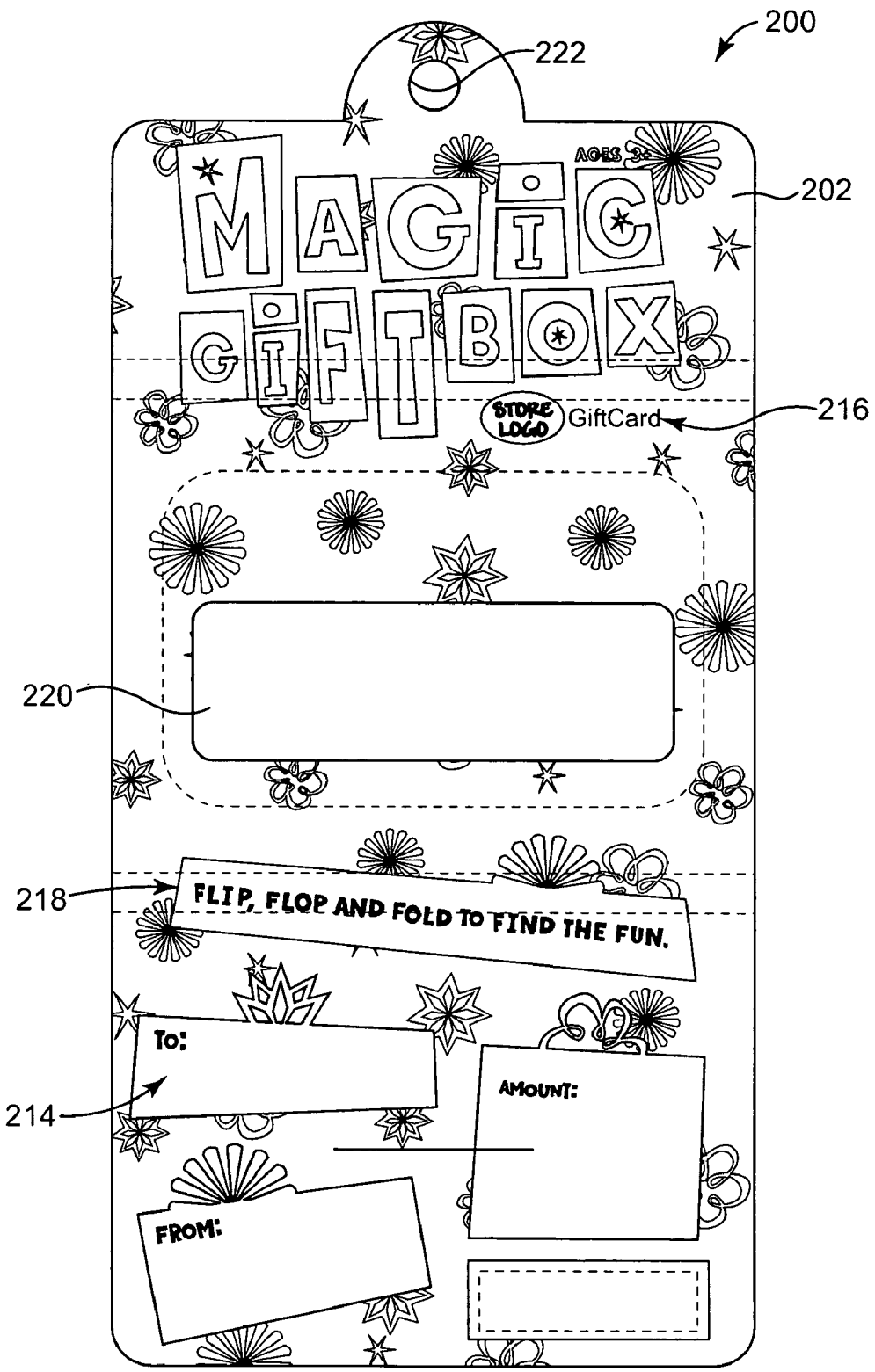
FIG. 14 illustrates one side of a backer, according to one embodiment of the present invention.
Figure 15:
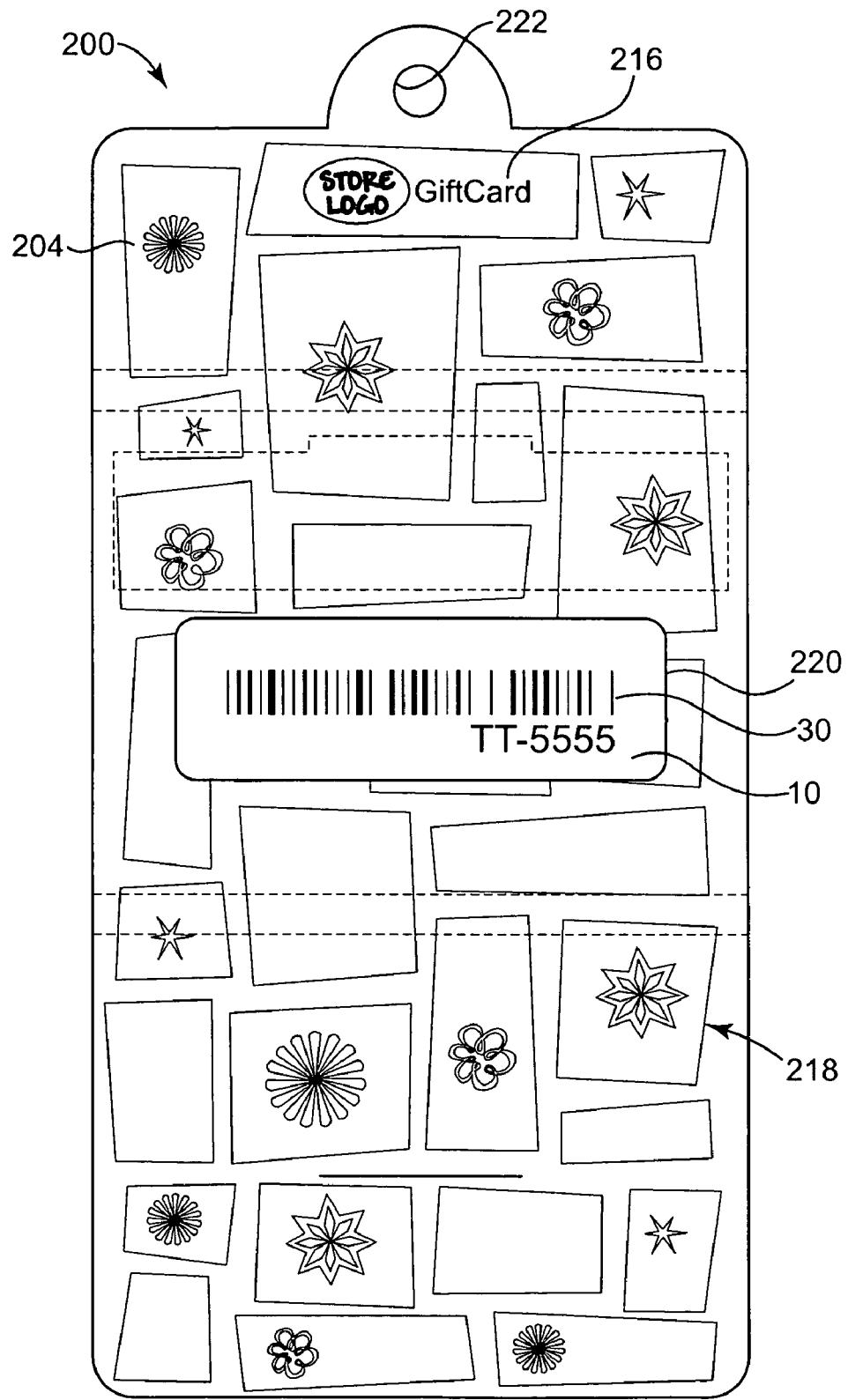
FIG. 15 illustrates the opposite side of the backer shown in FIG. 14 with a transaction product, according to one embodiment of the present invention.

FIGS. 14 and 15 illustrate a carrier or backer 200 supporting transaction product 10 (FIGS. 1-3). Backer 200 comprises a single layer or multiple layers of paper or plastic material, for example, generally in the form of a relatively stiff but bendable/flexible card. Use of other materials to form backer 200 is also contemplated. Backer 200 defines a first or front surface 202 (FIG. 14) and a second or rear surface 204 (FIG. 15).

Transaction product 10, which is generally represented in broken lines for illustrative purposes (e.g., to allow for full viewing of front surface 202), is readily releasably attached to backer 200, for example, by adhesive, blister packaging, overlying skinning material, or the like, such that transaction product 10 and backer 200 collectively define a transaction product assembly 206.

In one embodiment, backer 200 displays indicia, graphics or text information including store logo(s), store name(s), slogans, advertising, instructions, directions, brand indicia, promotional information, holiday indicia, seasonal indicia, media format identifiers, characters, and/or other information. The various indicia may be included on one or more of front and rear surfaces 202 and 204. In one example, the indicia include one or more of redemption indicia 210, message field indicia 214, brand indicia 216, decorative indicia 218, etc.

Redemption indicia 210, which are generally indicated by a dashed box in FIG. 15, indicate that transaction product 10 is redeemable for the purchase of goods and/or services and that upon use, a value of the purchased goods and/or services will be deducted from the account or record linked to transaction product 10. In one embodiment, redemption indicia 210 include phrases such as "<NAME OF STORE> GiftCard" and "This GiftCard is redeemable for merchandise or services at any of our stores or at our website," and/or provides help or phone line information in case of a lost, stolen or damaged transaction product 10, etc.

Message field indicia 214, for example, include "to," "from," and "amount" fields configured to be written to by the bearer of transaction product assembly prior to presenting the transaction product assembly 206 to a recipient. Brand indicia 216 identify a store, brand, department, etc. and/or services associated with transaction product 10.

Any decorative indicia 218 may also be included on backer 200. Decorative indicia 218 may include, for example, graphics that illustrate a particular holiday or event (e.g., Christmas, Arbor Day, an individual's birthday, etc.) Any of indicia 210, 212, 214, 216, 218, or other indicia optionally may appear anywhere on backer 200 or transaction product 10. Additional information besides that specifically described and illustrated herein may also be included.

In one embodiment, backer 200 defines a window or opening 220 for displaying account identifier 30 of transaction product 10 as illustrated in FIG. 15. As previously described, account identifier 30 is adapted for accessing an account or record associated with transaction product 10 for activating, loading or debiting value from the account or record. Accordingly, in one embodiment, opening 220 allows access to account identifier 30 to activate and/or load transaction product 10 without removing transaction product 10 from backer 200.

In one embodiment, backer 200 defines a hanging aperture 222 configured to receive a support arm or hook, such that transaction product assembly 206 can be hung from a rail or rack within the retail setting or elsewhere to facilitate display of transaction product assembly 206. According to one embodiment, FIG. 15 illustrates surfaces of backer 200 that will be supported on a rack or other fixture while FIG. 14 illustrates surfaces of backer 200 that will be visible to a consumer of a retail store who is considering the purchase of transaction product assembly 206. Other backers, such as foldable backers (not shown), can be used with various sizes and shapes of transaction products 10.

Figure 12:
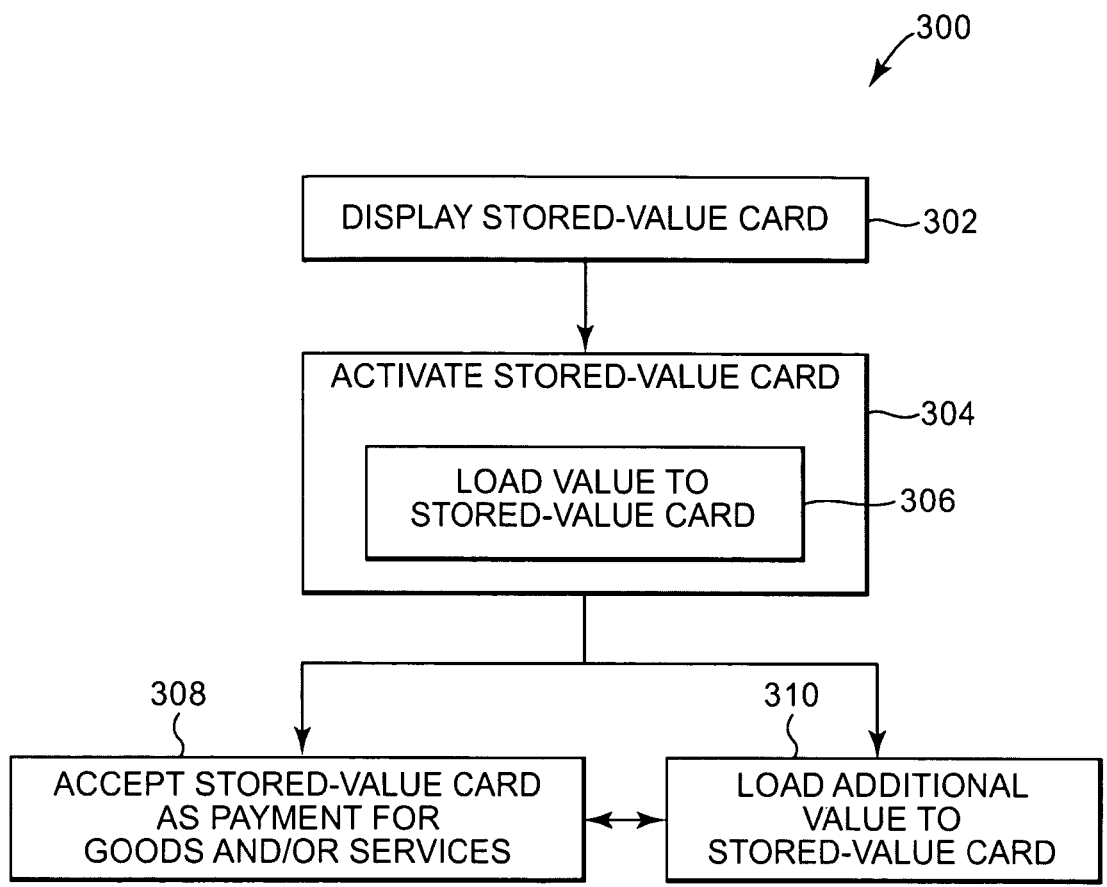
FIG. 12 is a flow chart illustrating a method of providing a transaction product, according to one embodiment of the present invention.

FIG. 12 is a flow chart illustrating one embodiment of a method 300 of encouraging purchase and facilitating use of one embodiment of transaction product 10 (e.g., a stored value card, as illustrated) by consumers and/or recipients. At 302, transaction product 10 is placed on or hung from a rack, shelf, or other similar device to display transaction product 10 for sale to potential consumers. In one embodiment, a depiction of transaction product 10 is placed on a web site for viewing and purchase by potential consumers.

At 304, a consumer who has decided to purchase transaction product 10 presents transaction product 10 on backer 100 to a retail store employee, retail store kiosk, remote terminal, or other person or device to scan account identifier 30 to access an account or record linked to account identifier 30. In particular, account identifier 30 is scanned or otherwise accessed, for example through opening 320 of backer 100 to activate transaction product 10. Upon accessing the account or record, then, at 306, value is added to the account or record in the form of monetary value, points, minutes, etc. In one embodiment, the account or record may have a value prior to activation such that operation 306 may be eliminated. Thus, transaction product 10 is activated and loaded.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 302, then, at 304, transaction product 10 may be activated in any suitable method and may not require the physical scanning of account identifier 30 to be activated or to otherwise access the associated account or record such as at 306.

In one example, at 308, the retail store or other affiliated retail setting or web site accepts transaction product 10 as payment toward the purchase of goods and/or services made by the current bearer of transaction product 10. In particular, the value currently loaded on transaction product 10 (i.e., stored or recorded in the account or record linked to account identifier 30) is applied toward the purchase of goods and/or services. At 310, additional value is optionally loaded on transaction product 10 at a point-of-sale terminal, kiosk, or other area of the retail store or related setting. Upon accepting transaction product 10 as payment at 308, the retail store or related setting can subsequently perform either operation 308 or operation 310 as requested by a current bearer of transaction product 10. Similarly, upon loading additional value on transaction product 10 at 310, the retail store or related setting can subsequently perform either operation 310 again or operation 308. In one example, the ability to accept transaction product 10 as payment for goods and/or services is limited by whether the account or record associated with transaction product 10 has any value stored or recorded therein at the time of attempted redemption.

Figure 13:
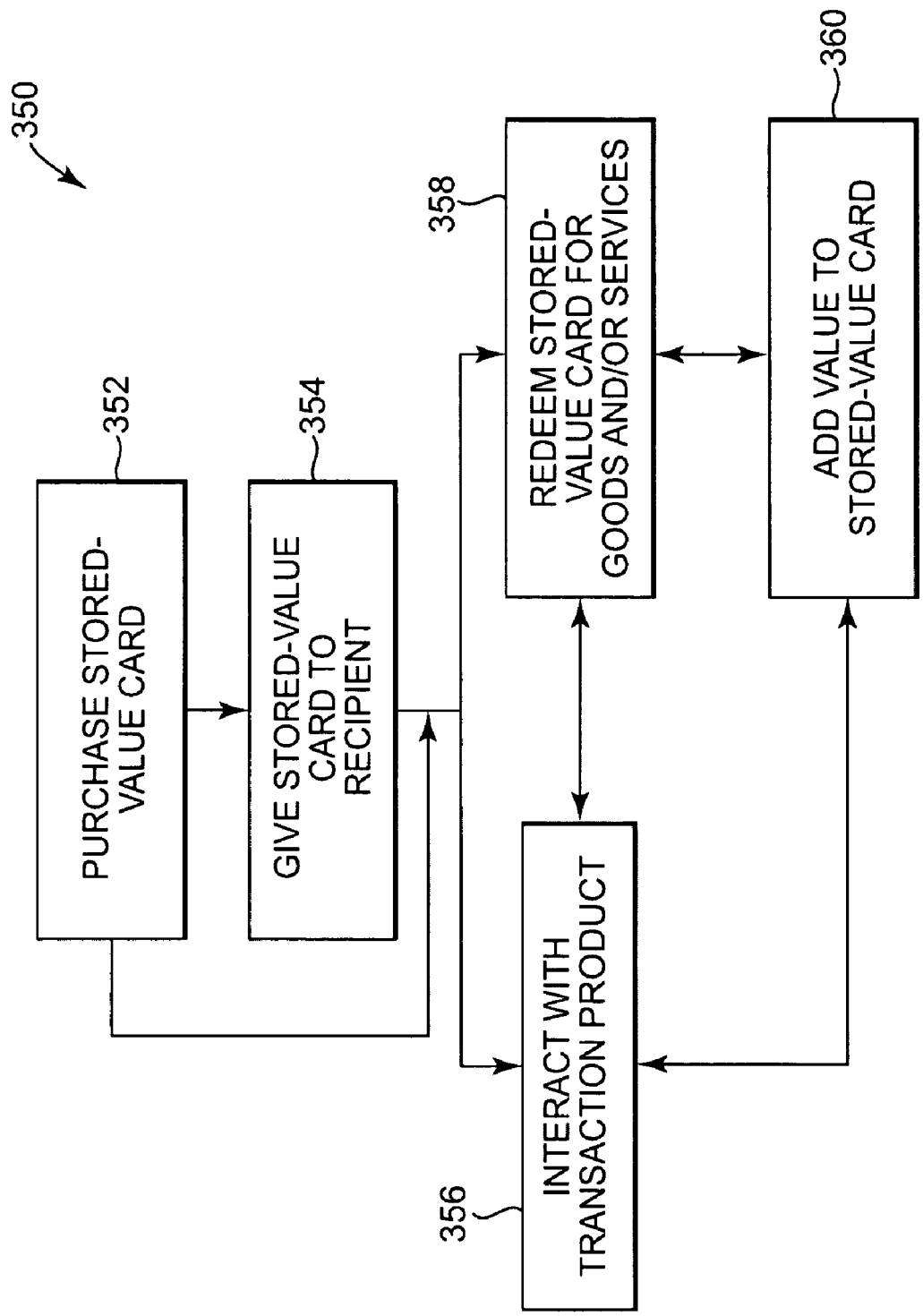
FIG. 13 is a flow chart illustrating a method of using a transaction product, according to one embodiment of the present invention.

FIG. 13 is a flow chart illustrating one embodiment of a method 350 of using transaction product 10 (e.g., FIGS. 1-7). At 352, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 206 (FIG. 15) along with backer 200. Upon purchasing transaction product 10, a retail store employee, a retail store kiosk, or other person or device scans account identifier 30 (FIGS. 3 and 15) through opening 114 of backer 200 or otherwise reads or accesses account identifier 30. Upon accessing account identifier 30, the account or record linked to account identifier 30 is accessed and activated to load value onto transaction product 10 (i.e., load value to the account or record associated with transaction product 10). In one embodiment, such as where transaction product 10 is purchased at 352 via a web site, actual scanning or other mechanical detection of account identifier 30 may be eliminated.

At 354, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, etc. as party favors or gifts. As an alternative, the consumer can keep transaction product 10 for his or her own use thereby eliminating operation 354.

At 356, the consumer, recipient, or other current bearer of stored value card 10 interacts with the card for the purposes of amusement, e.g., by manipulating the various puzzle segments of stored value card 10 to reveal different graphics, etc.

At 358, the consumer or recipient redeems transaction product 10 for goods and/or services from the retail store or web site. At 360, the consumer or recipient of transaction product 10 optionally adds value to transaction product 10, more particularly, to the account or record associated with account identifier 30 included therewith, at the retail store or over the Internet (i.e., via the web site). The consumer or recipient of transaction product 10 subsequently can perform either of operations 356, 358, or 360 as desired. In one embodiment, the ability of the consumer or recipient to repeat redeeming transaction product 10 at 358 is limited by whether the account or record linked with transaction product 10 has any remaining value stored or recorded therein at the time of attempted redemption.

Although described above as occurring at a single retail store or web site, in one embodiment, purchasing transaction product 10 at 352, redeeming transaction product 10 at 358, and adding value to transaction product 10 at 360, can each be performed at any one of a number of stores adapted to accept transaction product 10 or over the Internet. In one example, a number of stores are each part of a chain or are similarly branded stores. In one example, a number of stores include at least one web site and/or at least one conventional brick and mortar store.

Stored-value cards or transaction cards come in many forms, according to embodiments of the invention. The gift card, like other stored-value cards, can be "re-charged" or "re-loaded" at the direction of the original consumer, the gift recipient, or a third party. The term "loading on" or "loaded on" herein should be interpreted to include adding to the balance of an account or record associated with a transaction product. The balance associated with the transaction product declines as the card is used, encouraging repeat visits or use. The card remains in the user's purse or wallet, serving as an advertisement or a reminder to revisit the associated merchant. Gift cards according to embodiments of the invention provide a number of advantages to both the consumer and the merchant. Other gift cards and transaction products according to embodiments of the invention include loyalty cards, merchandise return cards, electronic gift certificates, calling cards, employee cards, frequency cards, prepaid cards, and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

The invention claimed is:

1. A transaction product comprising:
    a plurality of puzzle segments configured to collapse into a closed state to form a profile having a credit card configuration, the credit card configuration having a length and a width in accordance with ISO/IEC 7810 ID1;
    a plurality of skin components each coupled to one or more of the plurality of puzzle segments to form a plurality of hinge structures, each of the plurality of hinge structures interconnecting at least two of the puzzle segments such that the transaction product is configured to undergo a closed chain of transformations, wherein the plurality of skin components comprises a first skin component directly coupled to a first puzzle segment, a second puzzle segment, and a third puzzle segment of the plurality of puzzle segments; and
    a machine readable account identifier coupled to at least one of the puzzle segments, the machine readable account identifier linking the transaction product to an account or record for tracking a value associated with the transaction product.

2. The transaction product of claim 1, wherein the machine readable account identifier is a bar code.

3. The transaction product of claim 1, wherein the machine readable account identifier includes at least one of a magnetic strip, a smart chip, and a radio frequency identification (RFID) device.

4. The transaction product of claim 1, wherein the plurality of skin components comprise a material selected from the group consisting of plastic, paper, and composite.

5. The transaction product of claim 1, wherein the plurality of skin components comprises:
    a first skin component defining a first hinge structure extending in a first direction with respect to a first puzzle segment; and
    a second skin component defining a second hinge structure extending in a second direction with respect to the first puzzle segment;
    wherein the first skin component and the second skin component are substantially parallel in a reference state, and are substantially perpendicular after undergoing one of the transformations.

6. The transaction product of claim 1 wherein:
    the first puzzle segment rotates in a first direction along a first axis with respect to the second puzzle segment,
    the third puzzle segment rotates in a second direction along a second axis with respect to the second puzzle segment,
    the first axis and second axis are substantially parallel,
    the first direction is substantially opposite the second direction, and
    the first skin component defines both the first axis and the second axis.

7. The transaction product of claim 1, wherein each of the plurality of puzzle segments is a three-dimensional polyhedron.

8. The transaction product of claim 7, wherein the plurality of puzzle segments comprises eight puzzle segments.

9. The transaction product of claim 8, wherein the plurality of skin components includes four skin components including the first skin component, and each of the four skin components interconnects three of the eight puzzle segments.

10. The transaction product of claim 1, wherein each of the plurality of puzzle segments rotates along an axis that is parallel to or orthogonal to an adjoining one of the plurality of puzzle segments.

11. The transaction product of claim 1, further including indicia provided on at least a portion of the plurality of skin components.

12. The transaction product of claim 1, wherein each of the plurality of puzzle segments is shaped differently than at least one other one of the plurality of puzzle segments.

13. The transaction product of claim 1, wherein the plurality of puzzle segments includes three differently shaped puzzle segments.

14. The transaction product of claim 1, wherein:
    one of the plurality of puzzle segments includes:
        a first substantially planar surface facing a first direction,
        a second substantially planar surface facing in a second direction opposite the first direction, and
        a third substantially planar surface facing in the second direction, the third substantially planar surface being spaced further away from the first substantially surface than the second substantially planar surface is spaced from the first substantially planar surface,
    another one of the plurality of puzzle segments includes:
        a fourth substantially planar surface facing in the first direction, and
        a fifth substantially planar surface facing in the second direction, and
    in one configuration of the transaction product during the chain of transformations, the fourth substantially planar surface directly abuts the second substantially planar surface, and the fifth substantially planar surface and the third substantially planar surface both extend in a common plane.

15. The transaction product of claim 1, wherein:
    each of the plurality of skin components defines at least two of the plurality of hinge structures,
    the at least two of the plurality of hinge structures each define a rotational axis for the at least two of the puzzle segments interconnected by the corresponding hinge structure, and
    the rotational axis of one of the at least two of the plurality of hinge structures extends in parallel with the rotational axis of another one of the least two of the plurality of hinge structures.

16. A method of providing a transaction card, comprising:
    providing a set of segments, wherein each segment in the set of segments is shaped differently than at least one other segment in the set of segments;
    hingedly interconnecting the set of segments such that the transaction card has a plurality of successive configurations that proceed in a closed loop, wherein one of the successive configurations includes a closed state to form a profile having a credit card configuration, the credit card configuration having a length and a width in accordance with ISO/IEC 7810 ID1; and;
configuring the set of segments to accept an account identifier that links the transaction card to an account or record including a value available toward one of a purchase and use of at least one of goods and services.

17. The method of claim 16, further comprising fixedly coupling the account identifier, which comprises a bar code, to one or more of the set of segments.

18. The method of claim 16, wherein hingedly interconnecting includes attaching a plurality of skin components to the set of segments.

19. The method of claim 18, wherein providing the set of segments comprises providing eight segments, and wherein hingedly connecting the set of segments includes interconnecting three of the eight segments via one of the plurality of skin components.

20. The method of claim 16, wherein providing the set of segments includes providing a plurality of polyhedral shapes.

21. The method of claim 16, wherein hingedly interconnecting the set of segments includes configuring the set of segments such that each of the segments rotates with respect to an adjoining one of the segments in a manner that is either parallel or orthogonal thereto.

22. A stored-value product comprising:
machine readable means for linking the stored-value product with at least one of an account and a record having a value associated therewith such that the stored-value product can be used as payment toward a purchase of one or more of goods and services;
means for interconnecting selected subsets of a set of three-dimensional puzzle pieces such that the stored-value product has a set of configurations comprising a first configuration and a set of second configurations that successively lead to the first configuration; and
wherein:
the machine readable means for linking is coupled to at least one of the three-dimensional puzzle pieces, the first configuration includes a closed state to form a profile having a credit card configuration, the credit card configuration having a length and a width in accordance with ISO/IEC 7810 ID1, and
the set of three-dimensional puzzle pieces includes eight three-dimensional segments and the means for interconnecting includes four hinge structures that each interconnect three of the three-dimensional puzzle pieces.

23. The stored-value product of claim 22, wherein the means for interconnecting includes a laminate structure bonded to the set of three-dimensional puzzle pieces.

24. The stored-value product of claim 22, wherein the set of three-dimensional puzzle pieces includes indicia that are variously exposed when manipulated to form the first configuration and the second configurations.

25. The stored-value product of claim 22, wherein the means for interconnecting comprises:
a first laminate structure defining a first hinge axis adjacent a first three-dimensional puzzle piece; and
a second laminate structure defining a second hinge axis adjacent the first three-dimensional puzzle piece, wherein the second hinge axis and the first hinge axis are substantially perpendicular;
wherein the first laminate structure is substantially parallel to the second laminate structure in the first configuration, and is at least partially perpendicular to the second laminate structure in one of the second configurations.

26. The stored-value product of claim 22, wherein the set of three-dimensional puzzle pieces comprises two substantially parallel layers of the three-dimensional puzzle pieces in the first configuration, and wherein at least two of the set of three-dimensional puzzle pieces rotate such that they are perpendicular to the two substantially parallel layers.

* * * * *